(12) United States Patent
Liang

(10) Patent No.: US 8,836,753 B2
(45) Date of Patent: Sep. 16, 2014

(54) METHOD, APPARATUS, AND SYSTEM FOR PROCESSING CASCADE CONFERENCE SITES IN CASCADE CONFERENCE

(71) Applicant: Huawei Device Co., Ltd., Guangdong (CN)

(72) Inventor: Liyan Liang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 143 days.

(21) Appl. No.: 13/715,436

(22) Filed: Dec. 14, 2012

(65) Prior Publication Data
US 2013/0100239 A1   Apr. 25, 2013

Related U.S. Application Data

(63) Continuation of application No. PCT/CN2011/083806, filed on Dec. 12, 2011.

(30) Foreign Application Priority Data

Dec. 24, 2010   (CN) .......................... 2010 1 0605183

(51) Int. Cl.
*H04N 7/15* (2006.01)
*H04M 3/56* (2006.01)

(52) U.S. Cl.
CPC ................. *H04M 3/56* (2013.01); *H04N 7/152* (2013.01); *H04N 7/15* (2013.01)
USPC ................... 348/14.08; 348/14.09; 348/14.12

(58) Field of Classification Search
CPC ........... H04N 7/15; H04N 7/152; H04N 3/56; H04N 7/14; H04N 7/141; H04N 7/142; H04N 7/147; H04N 7/148
USPC .......................... 348/14.01–14.16; 379/202.01
See application file for complete search history.

(56) References Cited

U.S. PATENT DOCUMENTS

2006/0233120 A1*  10/2006  Eshel et al. ................... 370/260
2008/0043645 A1   2/2008  Anson et al.
(Continued)

FOREIGN PATENT DOCUMENTS

| CN | 1885785 A | 12/2006 |
| CN | 1953537 A | 4/2007 |

(Continued)

OTHER PUBLICATIONS

Written Opinion of the International Searching Authority in corresponding PCT Patent Application No. PCT/CN2011/083806 (Mar. 22, 2012).

(Continued)

*Primary Examiner* — Melur Ramakrishnaiah
(74) *Attorney, Agent, or Firm* — Leydig, Voit & Mayer, Ltd.

(57) ABSTRACT

Embodiments of the present invention disclose a method for processing cascade conference sites in a cascade conference, which may be used to implement one-to-one correspondence between an image orientation and a voice orientation of each conference site in the cascade conference, and improve the user experience of a participant. Certain embodiments of the present invention include: receiving an audio code stream sent by a cascade conference site, where the audio code stream sent by the cascade conference site is sent to different conference sites through different audio sound channels or audio cascade channels; receiving an audio code stream sent by a non-cascade conference site; and selecting audio data satisfying a preconfigured condition from audio data to be selected.

17 Claims, 6 Drawing Sheets

(56) References Cited

U.S. PATENT DOCUMENTS

| | | |
|---|---|---|
| 2008/0267282 A1 | 10/2008 | Kalipatnapu et al. |
| 2008/0273078 A1* | 11/2008 | Grasley et al. ............. 348/14.08 |
| 2009/0079815 A1 | 3/2009 | Baird |
| 2009/0154659 A1 | 6/2009 | Morin |
| 2010/0182394 A1 | 7/2010 | Zhan |
| 2011/0018960 A1* | 1/2011 | Eshkoli et al. ............. 348/14.09 |
| 2011/0307585 A1 | 12/2011 | Wang et al. |

FOREIGN PATENT DOCUMENTS

| | | |
|---|---|---|
| CN | 101132516 A | 2/2008 |
| CN | 101427574 A | 5/2009 |
| CN | 101540872 A | 9/2009 |
| EP | 2202970 A1 | 6/2010 |
| JP | 2001186491 A | 7/2001 |

OTHER PUBLICATIONS

Chinese Search Report in corresponding Chinese Patent Application No. 201010605183.1 (Jul. 25, 2013).

International Search Report in corresponding PCT Patent Application No. PCT/CN2011/083806 (Mar. 22, 2012).

* cited by examiner

METHOD, APPARATUS, AND SYSTEM FOR PROCESSING CASCADE CONFERENCE SITES IN CASCADE CONFERENCE

CROSS-REFERENCE TO RELATED APPLICATIONS

This application is a continuation of International Patent Application No. PCT/CN2011/083806, filed on Dec. 12, 2011, which claims priority to Chinese Patent Application No. 201010605183.1, filed on Dec. 24, 2010, both of which are hereby incorporated by reference in their entireties.

FIELD OF THE INVENTION

The present invention relates to the field of communications technologies, and in particular, to a method, an apparatus, and a system for processing cascade conference sites in a cascade conference.

BACKGROUND OF THE INVENTION

In a common video conference, generally a conference is held among ordinary conference sites under a multipoint control unit (MCU, Multipoint Control Unit), namely, ordinary conference sites in a conference are all connected onto a same MCU. However, as the conference capacity is increased or the networking is more and more complex, it is required to hold a cascade conference, namely, not only conference sites under each MCU participate in the conference, but also multiple MCU conferences are connected into a conference through a cascade conference site among multiple MCUs, so as to achieve the objective that multiple MCU conference sites hold a conference together. For example, a certain system needs to hold a nationwide conference, and the system has an MCU and a conference site in Beijing, each provincial capital, each prefecture-level city, and each county, so that the cascade conference of a nationwide range may be held, MCUs are arranged in Beijing, each provincial capital, and each prefecture-level city, respectively, and each conference site is connected to an MCU which the conference site belongs to. Because participating conference sites are numerous, and are dispersed at different places, each conference site is only required to be connected to the nearest MCU through a cascade conference, thereby reducing demands for a network.

A specific example is taken in the following to describe an existing method for processing cascade conference sites in a cascade conference. As shown in FIG. 1, in the cascade conference including telepresence conference sites, an MCU1 is connected to three conference sites which are telepresence conference sites T1 and T3 and an ordinary conference site T2, the telepresence conference site T1 includes three screens which are T1L, T1C, and T1R, and the telepresence conference site T3 includes three screens which are T3L, T3C, and T3R; an MCU2 is connected to three conference sites which are telepresence conference sites T4 and T6 and an ordinary conference site T5, the telepresence conference site T4 includes three screens which are T4L, T4C, and T4R, and the telepresence conference site T6 includes three screens which are T6L, T6C, and T6R.

It is assumed that each MCU supports reservation of audio data of two parties with the maximum voices, namely, the MCU at most selects audio data of two conference sites with the maximum voices from all connected conference sites (including the ordinary conference site, the telepresence conference site, and the cascade conference site) to perform sound mixing, and if there are less than two connected conference sites, the MCU selects data of all connected conference sites to perform sound mixing.

If the MCU1 and the MCU2 hold a conference in a cascade, a cascade audio channel is T12, and it is assumed that a cascade video channel is a video code stream which is the middle screen T1C of the conference site T1. The conference sound mixing processing is: in the MCU1 processing, it is assumed that the cascade channel is sound mixing of two parties with the maximum voices, and it is assumed that when the two parties with the maximum voices on the MCU1 are conference sites T1 and T2, a sound mixing code stream output by the MCU1 to the MCU2 through the cascade audio channel is T12=T1+T2. In the MCU2, it is assumed that when the two parties with the maximum voices are the cascade conference sites T12 and T5, if images displayed by the telepresence conference sites T4 and T6 are T1C, T5, T6R, and T4L, T1C, T5, respectively, a case of voices heard in the conference sites T4 and T6 is as follows:

The voice heard in the conference site T4 is T12+T5, namely, T1+T2+T5, and meanwhile because the conference site T4 is a telepresence conference site, images displayed by three screens of the conference site T4 are images of the middle screen, namely, T1C, of the conference site T1, T5, and the right screen T6R of the conference site T6, respectively. Because a user intends that the orientation of the seen image corresponds to the orientation of the heard voice in the conference site T4, namely, the voice of T1 is heard at the left, the voice of T5 is heard in the middle, and the voice of T6 is heard at the right, and because the voice of each conference site itself has a certain orientation, which is unnecessarily consistent with the orientation where the image is displayed, the MCU2 needs to process the voice heard in T4, namely, performs orientation adjustment on the voice of each conference site, adjusts the voice to the orientation of the corresponding image, and then, performs sound mixing to output the voice to the conference site T4, and in this way, the orientation of the voice heard in T4 can correspond to the orientation of the image.

The telepresence conference site T6 also has the same problem as that in T4, and it is also required to adjust the orientation of the voice (T12+T5) heard in T6, so that the adjusted orientation of the voice corresponds to the orientation of the seen image. For the conference sites T4, T5, and T6, because these three conference sites are directly connected to the MCU2, the MCU2 may directly process audio data of the conference sites, so as to adapt to orientation adjustment of the conference sites T4 and T6, respectively.

In the foregoing solution of the prior art, T12 is a cascade conference site, and the audio data is a result of sound mixing of the previous level MCU, namely, is the sum of data of the conference sites T1 and T2. Because both T4 and T6 display the image of the conference site T1C, but locations of the image are different, if the audio orientation of T1 is adjusted according to the location where the image is displayed in each conference site, because data of T1 and of T2 cannot be separated, that is, the voice orientation of T2 is adjusted simultaneously, and because orientations of the image of T1 seen in two conference sites are different, which inevitably causes that orientations of T2 heard in T4 and T6 are different, the effect of one-to-one correspondence between the image orientation and the voice orientation of each conference site in the cascade conference cannot be achieved.

It can be seen from the foregoing descriptions that, the audio data of the cascade conference site is used as the result of sound mixing of the previous level MCU, and the voice orientation of the audio data of the cascade conference site is usually not consistent with the location where the image of the conference site is displayed; because it is used as the result of sound mixing, the data cannot be separated, and for different display screens, when the audio orientation is adjusted, the audio corresponding to the display screen cannot be individually adjusted, while the result of sound mixing is adjusted in a unified manner, namely, the audio orientation which should not be adjusted is also adjusted, one-to-one correspondence between the image orientation and the voice orientation of each conference site in the cascade conference cannot be implemented, thereby reducing the user experience of a participant.

SUMMARY OF THE INVENTION

Embodiments of the present invention provide a method, an apparatus, and a system for processing cascade conference sites in a cascade conference, which are used to implement one-to-one correspondence between an image orientation and a voice orientation of each conference site in the cascade conference, and improve the user experience of a participant.

A method for processing cascade conference sites in a cascade conference provided in an embodiment of the present invention includes: receiving an audio code stream sent by a cascade conference site, where the audio code stream sent by the cascade conference site is sent to different conference sites through different audio sound channels or audio cascade channels; receiving an audio code stream sent by a non-cascade conference site; selecting audio data satisfying a preconfigured condition from audio data to be selected, where the audio data to be selected includes: the received audio code stream sent by the cascade conference site and the received audio code stream sent by the non-cascade conference site; and adjusting an orientation sequence of the audio data satisfying the preconfigured condition.

Another method for processing cascade conference sites in a cascade conference provided in an embodiment of the present invention includes: receiving an audio code stream sent by a non-cascade conference site; selecting audio data satisfying a preconfigured condition from audio data to be selected, where the audio data to be selected at least includes the received audio code stream sent by the non-cascade conference site; processing the audio data satisfying the preconfigured condition to different conference sites through different audio sound channels or audio cascade channels to obtain cascade conference site audio data, so that a first cascade conference site can identify the cascade conference site audio data; encoding the cascade conference site audio data to obtain an audio code stream; and sending the audio code stream to the first cascade conference site.

An apparatus for processing cascade conference sites in a cascade conference provided in an embodiment of the present invention includes: a receiving unit, configured to receive an audio code stream sent by a cascade conference site, where the audio code stream sent by the cascade conference site is sent to different conference sites through different audio sound channels or audio cascade channels, and further configured to receive an audio code stream sent by a non-cascade conference site; a selecting unit, configured to select audio data satisfying a preconfigured condition from audio data to be selected, where the audio data to be selected includes: the received audio code stream sent by the cascade conference site and the received audio code stream sent by the non-cascade conference site; and a sequence adjusting unit, configured to adjust an orientation sequence of the audio data satisfying the preconfigured condition.

Another apparatus for processing cascade conference sites in a cascade conference provided in an embodiment of the present invention includes: a receiving unit, configured to receive an audio code stream sent by a non-cascade conference site; a selecting unit, configured to select audio data satisfying a preconfigured condition from audio data to be selected, where the audio data to be selected at least includes the received audio code stream sent by the non-cascade conference site; a processing unit, configured to process the audio data satisfying the preconfigured condition to different conference sites through different audio sound channels or audio cascade channels to obtain cascade conference site audio data, so that a first cascade conference site can identify the cascade conference site audio data; an encoding unit, configured to encode the cascade conference site audio data to obtain an audio code stream; and a sending unit, configured to send the audio code stream to the first cascade conference site.

The present invention further provides a cascade conference system.

It can be seen from the foregoing technical solutions that, the embodiments of the present invention have the following advantages:

It can be seen from the foregoing technical solutions provided in the embodiments of the present invention that, because the audio code stream sent by the cascade conference site and received by the apparatus for processing the cascade conference sites in the cascade conference of the embodiments of the present invention is sent to different conference sites through different audio sound channels or audio cascade channels, when the apparatus for processing the cascade conference sites in the cascade conference needs to perform orientation sequence adjustment on the audio data, the audio data orientation required to be adjusted can directly be adjusted individually, namely, the adjustment performed by the apparatus for processing the cascade conference sites in the cascade conference on a single audio data orientation does not influence other audio data, and one-to-one correspondence between the image orientation and the voice orientation of each conference site in the cascade conference can be implemented, thereby improving the user experience of the participant.

BRIEF DESCRIPTION OF THE DRAWINGS

To illustrate the technical solutions in the embodiments of the present invention more clearly, the accompanying drawings required for describing the embodiments are briefly introduced in the following. Apparently, the accompanying drawings in the following description are merely some embodiments of the present invention, and persons of ordinary skill in the art can further derive other drawings according to these accompanying drawings.

DETAILED DESCRIPTION OF THE EMBODIMENTS

Embodiments of the present invention provide a method, an apparatus, and a system for processing cascade conference sites in a cascade conference, which are used to implement one-to-one correspondence between an image orientation and a voice orientation of each conference site in a cascade conference, and improve the user experience of a participant.

To make the objectives, features, and advantages of the present invention clearer and more comprehensible, the technical solutions in the embodiments of the present invention are clearly and completely described in the following with reference to the accompanying drawings in the embodiments of the present invention. Apparently, the embodiments in the following description are merely a part rather than all of the embodiments of the present invention. All other embodiments obtained by persons skilled in the art based on the embodiments of the present invention shall fall within the protection scope of the present invention.

Figure 1:
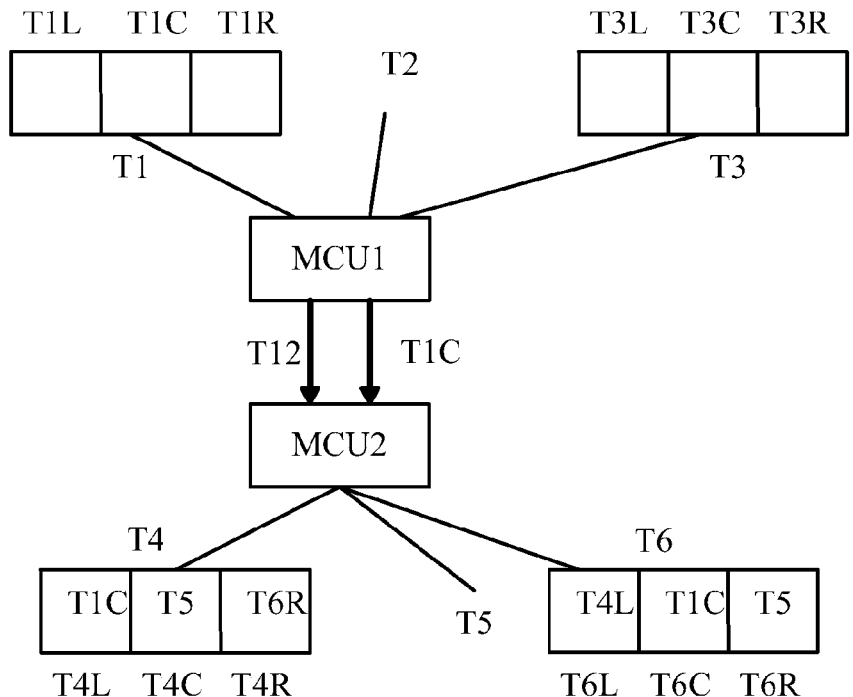
FIG. 1 is a structural diagram of cascade conference sites in a cascade conference in the prior art.
Figure 2:
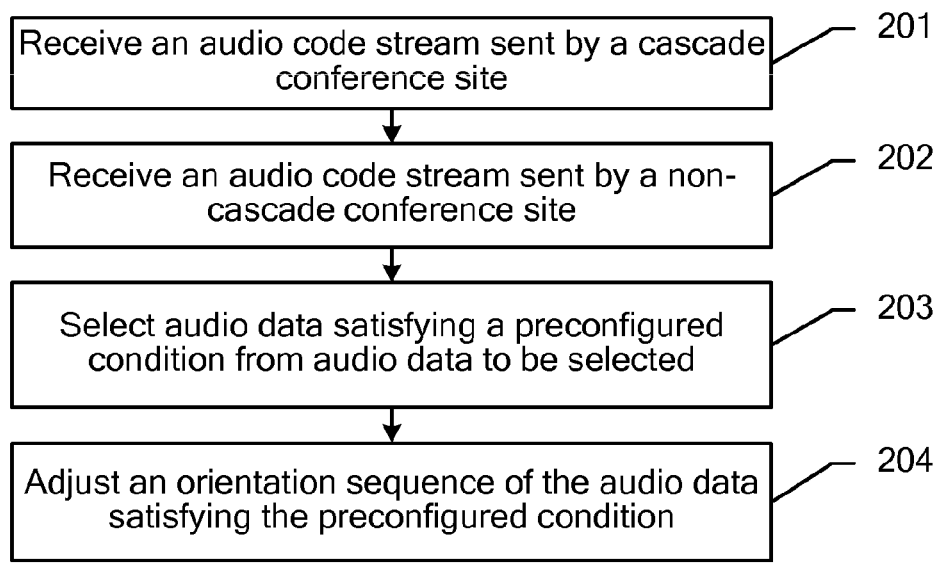
FIG. 2 is a schematic diagram of an embodiment of a method for processing cascade conference sites in a cascade conference according to an embodiment of the present invention.

A method for processing cascade conference sites in a cascade conference provided in an embodiment of the present invention is first introduced. Referring to FIG. 2, a process of a method for processing cascade conference sites in a cascade conference according to an embodiment of the present invention is described. The processing process of an apparatus which is for processing cascade conference sites in a cascade conference and is used as a receiving end is described in the embodiment; the apparatus for processing cascade conference sites in a cascade conference is connected to a cascade conference site, and is further connected to a non-cascade conference site, such as: an ordinary conference site and/or a telepresence conference site. The embodiment of the present invention includes the following steps:

201: Receive an audio code stream sent by a cascade conference site.

Specifically, the audio code stream sent by the cascade conference site connected to the apparatus for processing cascade conference sites in the cascade conference may be received. In the embodiment of the present invention, the received audio code stream sent by the cascade conference site is sent to different conference sites through different audio sound channels or audio cascade channels, which is different from the prior art where the cascade conference site performs sound mixing on the audio code stream and then sends the audio code stream.

In the embodiment of the present invention, one audio cascade channel may only be set, the audio cascade channel includes more than two audio sound channels, and the audio code stream is sent to different conference sites through different audio sound channels, namely, audio code streams of different conference sites are transmitted in different audio sound channels, respectively.

In the embodiment of the present invention, more than two audio cascade channels may also be set, and the audio code stream is sent to different conference sites through different audio cascade channels, namely, audio code streams of different conference sites are transmitted in the audio cascade channels, respectively. When the audio code stream is sent to different conference sites through different audio cascade channels, the embodiment of the present invention further includes: receiving audio cascade channel composition information sent by the cascade conference site, where the audio cascade channel composition information is quantity information of audio cascade channels established by the cascade conference site, so as to obtain the quantity of audio cascade channels occupied by the received audio code stream sent by the cascade conference site.

202: Receive an audio code stream sent by a non-cascade conference site.

Specifically, the audio code stream sent by an ordinary conference site connected to the apparatus for processing cascade conference sites in the cascade conference, and/or the audio code stream corresponding to each screen of a telepresence conference site connected to the apparatus for processing cascade conference sites in the cascade conference may be received. In the embodiment of the present invention, multiple audio code streams corresponding to each screen of the telepresence conference site, respectively, are input as a single audio code stream, respectively, the multiple audio code streams are independent of each other, and the telepresence conference site sends the multiple audio code streams independently.

It should be noted that, in the embodiment of the present invention, no sequence difference between step 201 and step 202 exists, and step 201 may first be executed and then step 202 is executed, and step 202 may first be executed and then step 201 is executed, and steps 201 and 202 may be simultaneously executed, which is not limited here.

203: Select audio data satisfying a preconfigured condition from audio data to be selected.

The audio data satisfying the preconfigured condition is selected from the audio data to be selected, where audio data of each conference site used as a piece of audio data participates in the selection about whether to satisfy the preconfigured condition, and the audio data to be selected includes: the received audio code stream sent by the cascade conference site and the received audio code stream sent by the non-cascade conference site. The quantity of the selected audio data is less than or equal to the predetermined quantity, where the predetermined quantity is set in advance according to the preconfigured condition.

In the embodiment of the present invention, the preconfigured condition may specifically be to reserve audio data of several parties with the maximum voices in a cascade conference site and a non-cascade conference site. For example, when audio data of three parties with the maximum voices in the cascade conference site and the non-cascade conference site is reserved, first three pieces of audio data from all audio data with voice volumes from the largest to the smallest are selected. According to the principle of reserving audio data of several parties with the maximum voices, audio data satisfying the preconfigured condition is screened out from the audio data, and the quantity of the selected audio data is less than or equal to the predetermined quantity.

In the embodiment of the present invention, the preconfigured condition may further specifically be to reserve audio data of a preset conference site, for example, a specific conference site may be preset, which may specifically be one or more than two conference sites designated by a user; in the embodiment of the present invention, satisfying the preconfigured condition is to reserve audio data of the preset conference site, for example, the audio data to be selected includes audio data of an ordinary conference site T1, audio data of an ordinary conference site T2, audio data of a telepresence conference site T3, and audio data of a telepresence conference site T4; it is assumed that the preconfigured condition is to only reserve audio data of the conference site T1 and audio data of the conference site T2 that are designated by the user, the audio data of the conference site T1 and the audio data of the conference site T2 may be reserved through the screening of the preconfigured condition, while because the audio data of the conference site T3 and the audio data of the conference site T4 are not audio data of the conference sites designated by the user, they are not reserved.

It should be noted that, in a practical application, the preconfigured condition may further specifically be to satisfy another condition, as long as the conditions may screen audio data of different conference sites, which are not limited here.

In the embodiment of the present invention, the predetermined quantity is preset, and is specifically determined according to reserved audio data of several parties with the maximum voices selected by the apparatus for processing cascade conference sites in the cascade conference. For example, the apparatus for processing cascade conference sites in the cascade conference supports reservation of audio data of two parties with the maximum voices, and then, the predetermined quantity is 2; the apparatus for processing cascade conference sites in the cascade conference supports reservation of audio data of three parties with the maximum voices, and then the predetermined quantity is 3. For example, when the apparatus for processing cascade conference sites in the cascade conference supports reservation of audio data of three parties with the maximum voices, if the quantity of conference sites (including the ordinary conference site, the telepresence conference site, and the cascade conference site) connected to the apparatus for processing cascade conference sites in the cascade conference is greater than or equal to three, three pieces of audio data with the maximum volumes may be selected as cascade conference site audio data; and if the quantity of conference sites connected to the apparatus for processing cascade conference sites in the cascade conference is less than three, less than three pieces of audio data can only be selected.

204: Adjust an orientation sequence of the audio data satisfying the preconfigured condition.

After the audio data satisfying the preconfigured condition is selected, the apparatus for processing cascade conference sites in the cascade conference adjusts an orientation sequence of the audio data satisfying the preconfigured condition, which may specifically be implemented by adopting the following manner:

If just one screen of a video source of the non-cascade conference site is displayed in one of multiple screens or in a picture at a location in a multi-picture, an output orientation sequence of audio data corresponding to all screens of the video source of the non-cascade conference site is the same as an display orientation sequence of the displayed screen in multiple screens or is an orientation sequence of the displayed screen in the picture at the location in the multi-picture. For example, a telepresence conference site T1 includes three screens T1L, TIC, and T1R, only the screen T1L among them is displayed, audio data output orientations corresponding to the three screens T1L, T1C, and T1R of the telepresence conference site are all the same as the display orientation sequence of the displayed screen T1L in the multiple screens, or are the same as the orientation sequence of the displayed screen T1L in a picture at the location in a multi-picture.

If more than two screens in multiple screens of the video source of the non-cascade conference site are displayed, an audio data output orientation sequence corresponding to the more than two displayed screens of the video source corresponds to an orientation sequence of these displayed screens of the video source one to one. The audio data output orientation sequence corresponding to non-displayed screens of the multiple screens of the video source is maintained the same as that of one of all the displayed screens of the video source. For example, the telepresence conference site T1 includes three screens T1L, T1C, and T1R, only screens T1L and T1C are displayed, while T1R is not displayed, the audio data output orientation sequences corresponding to the displayed T1L and T1C are the same as the orientation sequences of the displayed T1L and T1C, and the audio data corresponding to the non-displayed T1R may be the same as the orientation sequence of one of all the displayed screens T1L and T1C.

If a screen in the video source of the non-cascade conference site is simultaneously displayed in multiple multi-pictures or in a multi-picture and an independent screen, priorities of output orientation sequences of audio data corresponding to the video source from the highest to the lowest in sequence are: an orientation of the independent screen, an orientation of a screen with a large sub-picture, and an orientation of a screen displayed at middle, left, and right priorities. For example, the telepresence conference site T1 includes three screens T1L, T1C, and T1R, and a screen T1L is displayed in multiple multi-pictures or in a multi-picture and an independent screen, priorities of sequences of the audio data output orientations corresponding to the screen T1L in sequence are: an orientation of the independent screen, an orientation of a screen with a large sub-picture, and an orientation of a screen displayed at middle, left, and right priorities.

It should be noted that, the foregoing embodiment is only one of manners where orientation adjustment is performed on the audio data according to the orientation sequence of the video source, and another implementation manner may also be adopted, as long as the orientation sequence of the output audio data meets a specific sequence requirement. For example, if the audio data of the non-cascade conference site satisfies the preconfigured condition and is reserved, but the image of the conference site is not seen, namely, this conference site is an invisible conference site, the adjustment policy may be: maintaining the orientation sequence of the audio data of the conference site itself, or, setting the orientation sequence of the audio data at a fixed location, such as, fixing at the middle orientation to spread the sound, or fixing at the orientations at two sides, and furthermore, because the image of the conference site is not seen, the orientation sequence may also be fixed at a certain place out of the screen.

In the embodiment of the present invention, because the audio code stream sent by the cascade conference site and received by the apparatus for processing cascade conference sites in the cascade conference is sent to different conference sites through different audio sound channels or audio cascade channels, when the apparatus for processing cascade conference sites in the cascade conference needs to perform orientation sequence adjustment on the audio data, the audio data that needs to be adjusted can directly be adjusted individually, namely, the adjustment performed by the apparatus for processing cascade conference sites in the cascade conference on a single audio data orientation does not influence other audio data, and one-to-one correspondence between an image orientation and a voice orientation of each conference site in the cascade conference can be implemented, thereby improving the user experience of a participant.

It should be noted that, in the embodiment shown in FIG. 2, after step 202, the method can further include: decoding the audio code stream sent by the cascade conference site and the audio code stream sent by the non-cascade conference site; and the audio data to be selected specifically includes: a result of decoding the audio code stream sent by the cascade conference site and the audio code stream sent by the non-cascade conference site.

In the foregoing embodiment, it is described that after receiving the audio code stream sent by the cascade conference site and the audio code stream sent by the non-cascade conference site, the apparatus for processing cascade conference sites in the cascade conference performs orientation sequence adjustment on the audio data. It is described in the following from the perspective that the apparatus for processing cascade conference sites in the cascade conference sends an audio code stream to a first cascade conference site, and reference may be made to the following embodiment.

Figure 3:
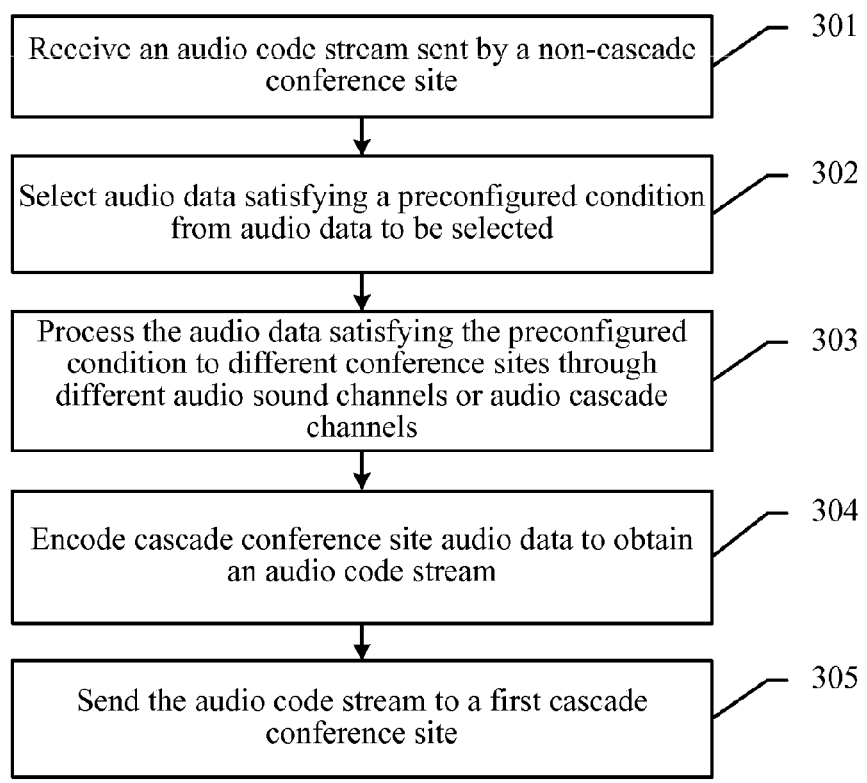
FIG. 3 is a schematic diagram of another embodiment of a method for processing cascade conference sites in a cascade conference according to an embodiment of the present invention.

A method for processing cascade conference sites in a cascade conference provided in an embodiment of the present invention is first introduced. Referring to FIG. 3, a process of a method for processing cascade conference sites in a cascade conference according to an embodiment of the present invention is described. A processing process of an apparatus for processing cascade conference sites in a cascade conference is described in the embodiment, and the apparatus for processing cascade conference sites in the cascade conference is connected to a first cascade conference site, and is further connected to a non-cascade conference site, such as an ordinary conference site and/or a telepresence conference site. The embodiment of the present invention includes the following steps:

301: Receive an audio code stream sent by a non-cascade conference site.

Specifically, an audio code stream sent by an ordinary conference site connected to the apparatus for processing cascade conference sites in the cascade conference, and/or an audio code stream corresponding to each screen of a telepresence conference site connected to the apparatus for processing cascade conference sites in the cascade conference may be received. In the embodiment of the present invention, multiple audio code streams corresponding to each screen of the telepresence conference site, respectively, are input as an independent audio code stream, respectively, the multiple audio code streams are independent of each other, and the telepresence conference site sends the multiple audio code streams independently.

302: Select audio data satisfying a preconfigured condition from audio data to be selected.

The audio data to be selected at least includes the audio code stream sent by the non-cascade conference site, the audio data satisfying the preconfigured condition is selected from the audio data to be selected, and the quantity of the selected audio data is less than or equal to the predetermined quantity, where the predetermined quantity is preset according to the preconfigured condition, and for description of the preconfigured condition, reference may be made to the description of step 203 in FIG. 2.

303: Process the audio data satisfying the preconfigured condition to different conference sites through different audio sound channels or audio cascade channels.

After the apparatus for processing cascade conference sites in the cascade conference selects the audio data satisfying the preconfigured condition, the audio data may be processed according to different conference sites occupying different audio sound channels or audio cascade channels, respectively, to obtain cascade conference site audio data, so that the first cascade conference site can identify the cascade conference site audio data.

It should be noted that, in the embodiment of the present invention, a conference site is taken as a unit for the processing on the audio data, and the processing is performed according to each audio sound channel or audio cascade channel, respectively; it may be ensured that processing on a single piece of audio data does not influence other audio data, and the specific processing method is illustrated in the subsequent embodiment.

304: Encode the cascade conference site audio data to obtain an audio code stream.

The cascade conference site audio data obtained in the foregoing step is encoded, and a result of the encoding is used as the audio code stream.

305: Send the audio code stream to the first cascade conference site.

After the audio code stream is obtained after the encoding is performed, the audio code stream is sent to the first cascade conference site. It should be noted that, in the embodiment of the present invention, the first cascade conference site is a cascade conference site directly connected to the apparatus for processing cascade conference sites in the cascade conference.

It may be seen from the embodiment of the present invention that, the apparatus for processing cascade conference sites in the cascade conference of the embodiment of the present invention processes the audio data satisfying the preconfigured condition to different conference sites through different audio sound channels or audio cascade channels to obtain the cascade conference site audio data, so that when orientation sequence adjustment needs to be performed on the audio data, the first cascade conference site used as a receiving end can directly adjust the audio data individually.

Figure 4:
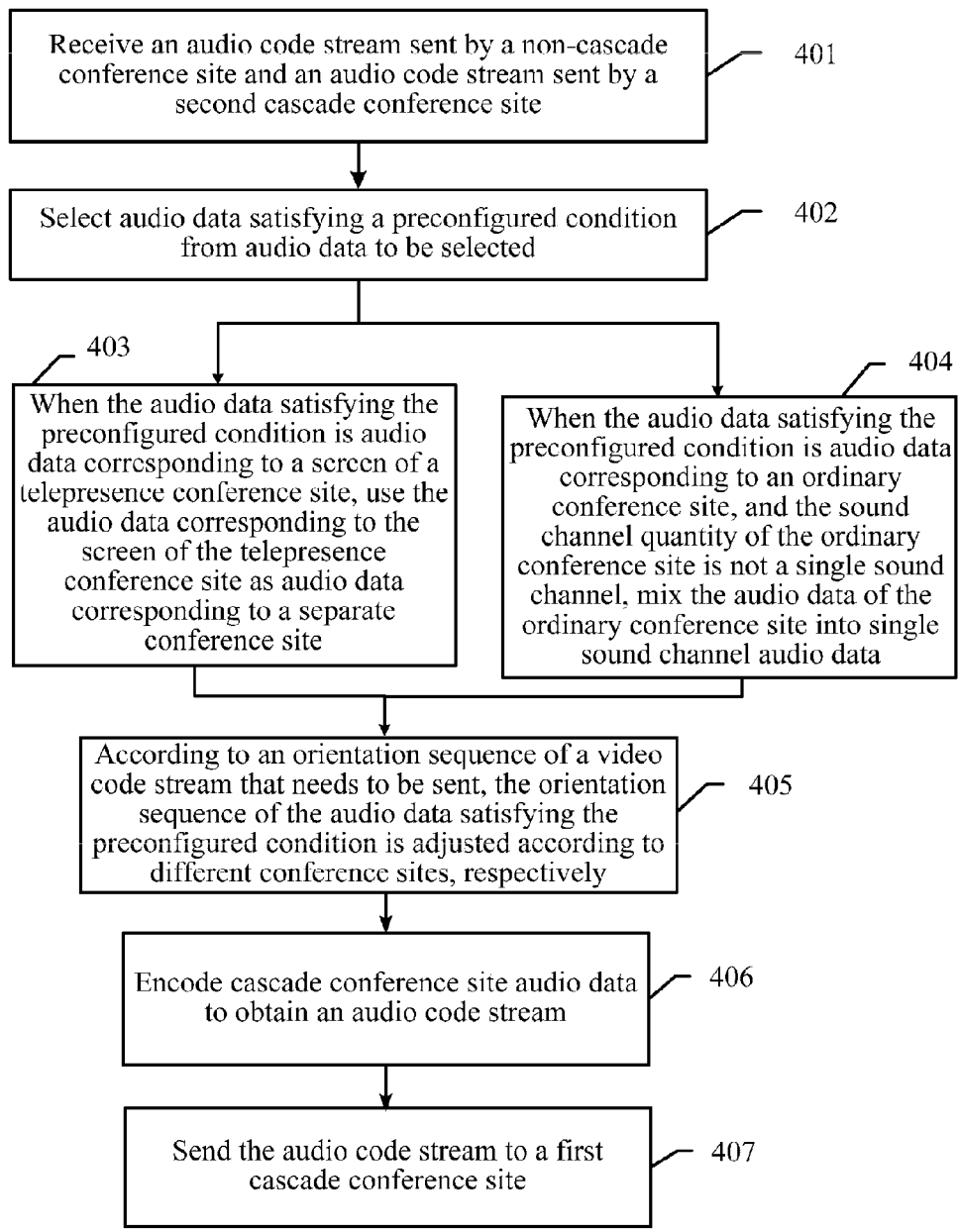
FIG. 4 is a schematic diagram of another embodiment of a method for processing cascade conference sites in a cascade conference according to an embodiment of the present invention.

Further, the present invention provides an embodiment of another method for processing cascade conference sites in a cascade conference. Specifically, referring to FIG. 4, an apparatus for processing cascade conference sites in a cascade conference is connected to a first cascade conference site and a second cascade conference site, and is further connected to a non-cascade conference site. In the embodiment of the present invention, only one audio cascade channel is set, and the audio cascade channel includes more than two audio sound channels, namely, an audio code stream is transmitted in each audio sound channel, respectively. The embodiment of the present invention includes:

401: Receive an audio code stream sent by the non-cascade conference site and an audio code stream sent by the second cascade conference site.

Specifically, an audio code stream sent by an ordinary conference site connected to the apparatus for processing cascade conference sites in the cascade conference, and/or an audio code stream corresponding to each screen of a telepresence conference site connected to the apparatus for processing cascade conference sites in the cascade conference may be received. In the embodiment of the present invention, multiple audio code streams corresponding to each screen of the telepresence conference site, respectively, are input as a single audio code stream, respectively, the multiple audio code streams are independent of each other, and the telepresence conference site sends the multiple audio code streams independently.

When the apparatus for processing cascade conference sites in the cascade conference is connected to the second cascade conference site, the apparatus for processing cascade conference sites in the cascade conference also receives the audio code stream sent by the second cascade conference site. It should be noted that, in the embodiment of the present invention, the second cascade conference site is a cascade conference site directly connected to the apparatus for processing cascade conference sites in the cascade conference.

402: Select audio data satisfying a preconfigured condition from audio data to be selected.

The audio data to be selected at least includes the audio code stream sent by the non-cascade conference site. In the embodiment of the present invention, the preconfigured condition may specifically be to reserve audio data of several parties with the maximum voices in a cascade conference site and a non-cascade conference site. According to the principle of reserving audio data of several parties with the maximum voices, audio data is screened out from the audio data to be selected, and the quantity of the selected audio data is less than or equal to the predetermined quantity.

In the embodiment of the present invention, those that participate in comparison of the reserved audio data of several parties with the maximum voices include the audio code stream sent by the non-cascade conference site and the audio code stream sent by the second cascade conference site, where the non-cascade conference site and the second cascade conference site are connected to the apparatus for processing cascade conference sites in the cascade conference; where the audio code stream of the second cascade conference site participates in comparison as an audio code stream of a conference site. In step 402, audio code streams of the second cascade conference site may be overlaid as an audio code stream to participate in comparison. In a practical application, envelope information of the audio code stream of the second cascade conference site may further be sent to the apparatus for processing cascade conference sites in the cascade conference in another manner such as in a real-time transport protocol (RTP, Real-time Transport Protocol) information filling manner, and after the apparatus for processing cascade conference sites in the cascade conference receives the audio envelope information, the audio envelope information participates in comparison of the reserved audio data of several parties with the maximum voices.

403: When the audio data satisfying the preconfigured condition is audio data corresponding to a screen of a telepresence conference site, use the audio data corresponding to the screen of the telepresence conference site as audio data corresponding to a separate conference site.

In the embodiment of the present invention, the screen of the telepresence conference site satisfying the preconfigured condition used as a separate conference site is transmitted through a separate audio sound channel, and the cascade conference site used as a conference site is also transmitted through a separate audio sound channel.

404: Alternatively, when the audio data satisfying the preconfigured condition is audio data corresponding to an ordinary conference site and the sound channel quantity of the ordinary conference site is not a single sound channel, mix the audio data of the ordinary conference site into single sound channel audio data.

In the embodiment of the present invention, the audio data of the ordinary conference site which satisfies the preconfigured condition and whose sound channel quantity is not a single sound channel is mixed into single sound channel audio data and transmitted through an audio sound channel.

405: According to the orientation sequence of a video code stream that needs to be sent, the orientation sequence of the audio data satisfying the preconfigured condition is adjusted according to different conference sites, respectively.

The video code stream that needs to be sent is a part of or all of a video code stream received by the apparatus for processing cascade conference sites in the cascade conference, and which video code streams that specifically needs to be sent to the first cascade conference site may be selected and decided by a user, and may also be decided by the apparatus for processing cascade conference sites in the cascade conference, which is not limited here.

In this step, the audio data which satisfies the preconfigured condition and whose orientation sequence is adjusted is used as cascade conference site audio data.

In the embodiment of the present invention, according to the orientation sequence of the video code stream that needs to be sent, the orientation sequence of the audio data satisfying the preconfigured condition is adjusted according to different conference sites, respectively, so that the first cascade conference site used as a receiving end can, according to the orientation sequence of the video code stream, identify the orientation sequence of the audio data satisfying the preconfigured condition.

In a practical application, if the video source corresponding to the audio data satisfying the preconfigured condition and the video code stream that needs to be sent are the same, the orientation sequence of the audio data satisfying the preconfigured condition is adjusted into an orientation sequence the same as that of the video code stream that needs to be sent; if the video source corresponding to the audio data satisfying the preconfigured condition and the video code stream that needs to be sent are different, the orientation sequence of the audio data satisfying the preconfigured condition is adjusted according to the policy described in step 204 in FIG. 2. For example, video code streams that need to be sent are T2, T1C, and T3R. If the audio data satisfying the preconfigured condition is T3R, T2, and T1L, because the audio data T2 and the video code stream T2 are the same, the audio data T2 is adjusted to a sequence the same as that of the video code stream, namely, left. The audio data T1L and the video code streams are not the same, but T1C exists in the video code streams, and because both the video code stream T1C and the audio code stream T1L are two code streams of a conference site T1, the orientation sequence of the audio data T1L is adjusted into the orientation sequence of the displayed video code stream T1C, namely, the audio data T1L is adjusted into the orientation sequence of the video source T1C, namely, middle. The audio data T3R and the video code stream T3R are the same, and the audio data T3R is adjusted to the right the same as the orientation of the video code stream T3R, and therefore, the audio data whose orientation sequence is adjusted is T2, T1L, and T3R.

It should be noted that, this step 405 may also be replaced with the following step:

Sequence the audio data satisfying the preconfigured condition according to different conference sites occupying different audio sound channels, and use the sequenced audio data satisfying the preconfigured condition as the cascade conference site audio data, where the sequencing may be performed by arranging in sequence according to the sequence of audio data of several parties with the maximum voices, and it may also be performed according to another sequence, which is not limited here.

And then, audio conference site location information is generated, where the audio conference site location information is location sequencing information of the audio data satisfying the preconfigured condition.

Finally, the generated audio conference site location information is sent to the first cascade conference site, and it may be sent to the first cascade conference site during specific implementation by adopting a data filling manner of RTP filling information, and likewise, another implementation manner may be adopted, which is not limited here.

406: Encode the cascade conference site audio data to obtain an audio code stream.

The cascade conference site audio data obtained in the foregoing step is encoded, that is, the audio code stream can be obtained.

407: Send the audio code stream to the first cascade conference site.

After the audio code stream is obtained after the encoding is performed, the audio code stream is sent to the first cascade conference site. It should be noted that, in the embodiment of the present invention, the first cascade conference site is another cascade conference site directly connected to the apparatus for processing cascade conference sites in the cascade conference.

In step 406 in the embodiment of the present invention, according to the orientation sequence of the video code stream that needs to be sent, the orientation sequence of the corresponding cascade conference site audio data is also adjusted, so that the first cascade conference site used as the receiving end can, according to the orientation sequence of the video code stream, identify the orientation sequence of the audio data satisfying the preconfigured condition, and the first cascade conference site may individually adjust the audio data.

It may be seen from the embodiment of the present invention that, the apparatus for processing cascade conference sites in the cascade conference of the embodiment of the present invention processes the audio data satisfying the preconfigured condition to different conference sites through different audio sound channels or audio cascade channels to obtain the cascade conference site audio data, so that when orientation sequence adjustment needs to be performed on the audio data, the first cascade conference site used as the receiving end can directly adjust the audio data individually.

Figure 5:
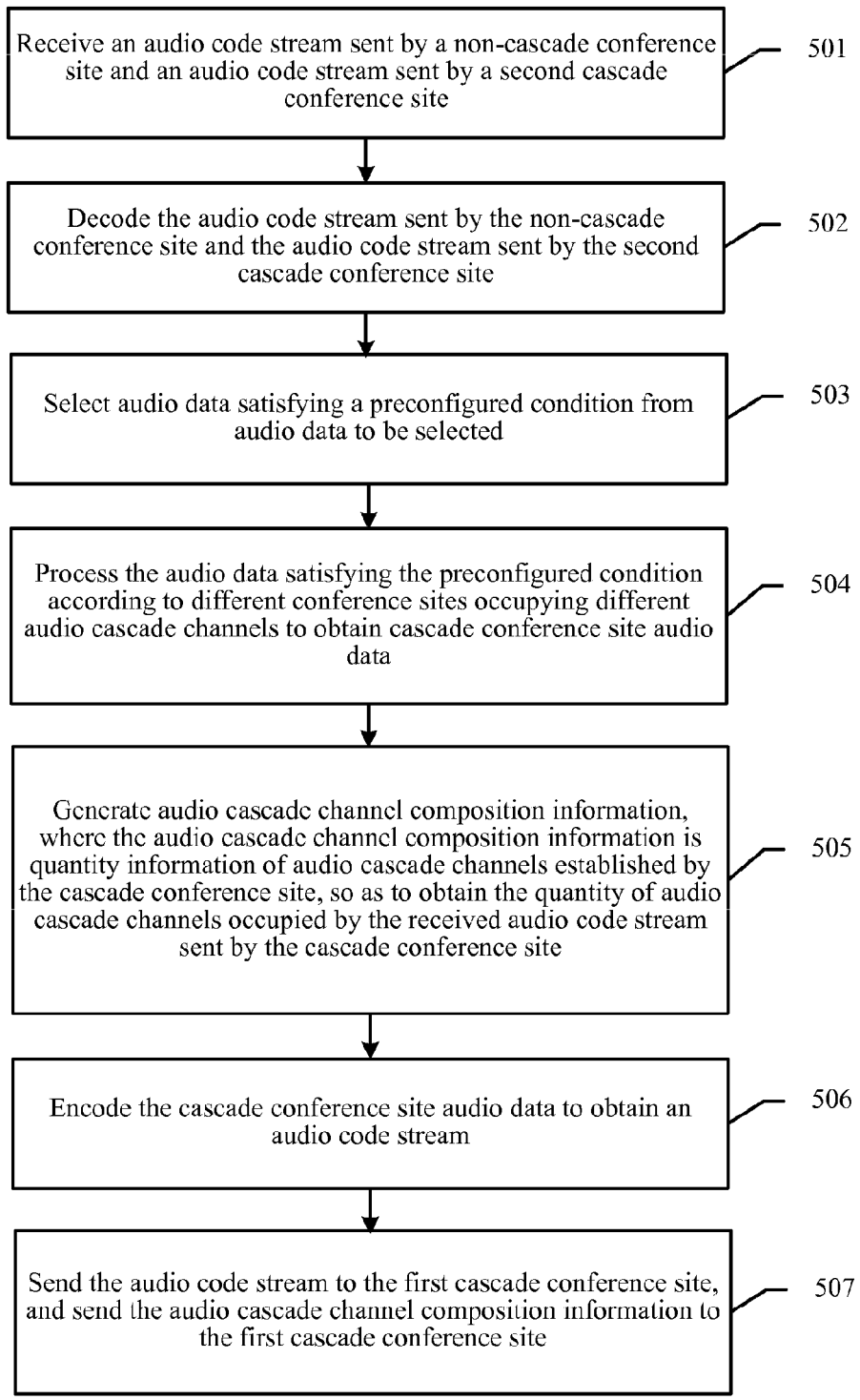
FIG. 5 is a schematic diagram of another embodiment of a method for processing cascade conference sites in a cascade conference according to an embodiment of the present invention.

Optionally, the present invention provides an embodiment of another method for processing cascade conference sites in a cascade conference. Specifically, referring to FIG. 5, the apparatus for processing cascade conference sites in a cascade conference is connected to a first cascade conference site and a second cascade conference site, and is further connected to a non-cascade conference site. In the embodiment of the present invention, more than two audio cascade channels are set, which is different from the prior art where only one audio cascade channel exists, namely, an audio code stream is transmitted in each audio cascade channel, respectively. The embodiment of the present invention includes:

501: Receive an audio code stream sent by the non-cascade conference site and an audio code stream sent by the second cascade conference site.

The content in this step is the same as the content in step 401 in the foregoing embodiment, and for details, reference may be made to the step, which is not described in detail here.

502: Decode the audio code stream sent by the non-cascade conference site and the audio code stream sent by the second cascade conference site.

After the audio code stream sent by the non-cascade conference site and a second audio code stream sent by the second cascade conference site are obtained, the audio code streams may be decoded. It should be noted that, when the audio code stream is decoded, it is an optional implementation manner.

503: Select audio data satisfying a preconfigured condition from audio data to be selected.

The audio data to be selected specifically includes: a result of decoding the audio code stream sent by the non-cascade conference site and the audio code stream sent by the second cascade conference site. In the embodiment of the present invention, according to the principle of reserving audio data of several parties with the maximum voices, audio data may be selected from the audio data to be selected, and the quantity of the selected audio data is less than or equal to the predetermined quantity.

504: Process the audio data satisfying the preconfigured condition according to different conference sites occupying different audio cascade channels to obtain cascade conference site audio data.

In this step, the audio data satisfying the preconfigured condition is processed according to different conference sites occupying different audio cascade channels, that is, one audio cascade channel is only used for transmitting audio data of a conference site, and the audio data satisfying the preconfigured condition is used as the cascade conference site audio data. In the embodiment of the present invention, the conference site satisfying the preconfigured condition used as a separate conference site transmits audio data through the audio cascade channel, and conference sites in the cascade conference cascade are set with multiple audio cascade channels, and then, in the embodiment of the present invention, audio data of each conference site may be processed according to each audio cascade channel, and the sound channel quantity of each audio cascade channel may be a single sound channel, double sound channels, three sound channels or even more sound channels, which is not limited here.

505: Generate audio cascade channel composition information, where the audio cascade channel composition information is quantity information of audio cascade channels established by the cascade conference site, so as to obtain the quantity of audio cascade channels occupied by the received audio code stream sent by the cascade conference site.

506: Encode the cascade conference site audio data to obtain an audio code stream.

The audio data satisfying the preconfigured condition in the foregoing step is encoded and used as the audio code stream.

507: Send the audio code stream to the first cascade conference site, and send the audio cascade channel composition information to the first cascade conference site.

After the audio code stream that needs to be sent is obtained after the encoding is performed, the audio code stream is sent to the first cascade conference site. Because, in the embodiment of the present invention, the apparatus for processing cascade conference sites in the cascade conference is set with multiple audio cascade channels, and the audio data satisfying the preconfigured condition of the audio cascade channels is always constantly changing, the audio cascade channel composition information further needs to be sent to the first cascade conference site in the embodiment of the present invention.

It may be seen from the embodiment of the present invention that, the apparatus for processing cascade conference sites in the cascade conference according to the embodiment of the present invention selects the audio data satisfying the preconfigured condition to send according to different audio cascade channels, respectively, so that when orientation sequence adjustment needs to be performed on the audio data, the apparatus for processing cascade conference sites in the cascade conference used as a receiving end can directly adjust the audio data individually.

Figure 6:
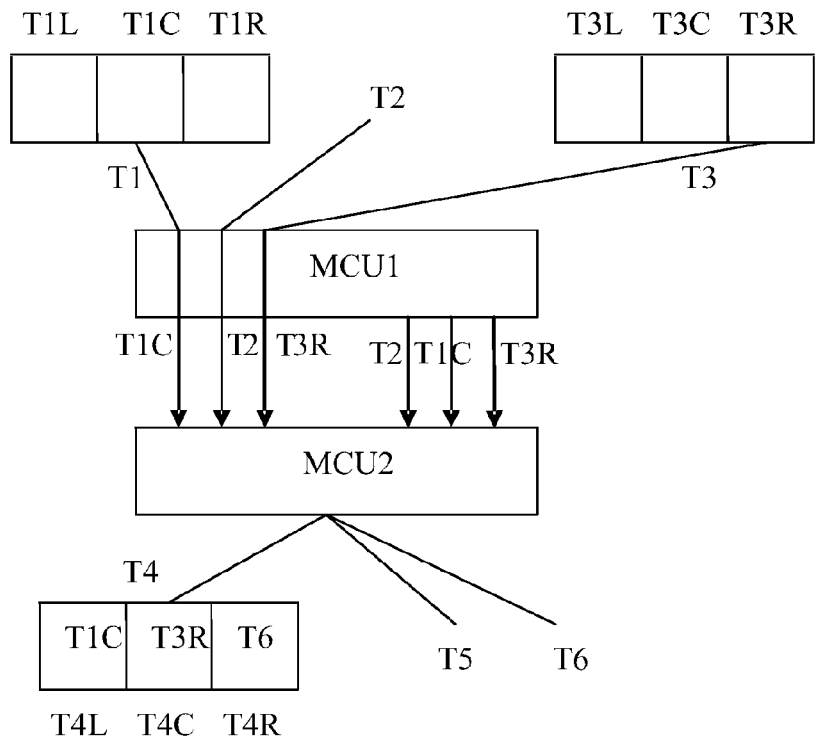
FIG. 6 is a structural diagram of cascade conference sites in a cascade conference according to an embodiment of the present invention.

An embodiment of the present invention is described in the following with a specific example. As shown in FIG. 6, a structure of cascade conference sites in a cascade conference according to an embodiment of the present invention is described; that an audio cascade channel is set and the audio cascade channel includes more than two audio sound channels is taken as an example, referring to what is shown in FIG. 6:

A cascade conference site includes two MCUs, which are an MCU1 and an MCU2, where the MCU1 is connected to the MCU2.

The MCU1 is connected to one ordinary conference site and two telepresence conference sites. FIG. 6 is a schematic diagram formed before an audio code stream sequence is adjusted. In FIG. 6, one ordinary conference site is T2, two telepresence conference sites are T1 and T3, and the telepresence conference sites T1 and T3 have three screens, respectively, which are T1L, T1C, T1R, and T3L, T3C, T3R, respectively; meanwhile, the MCU2 used as a cascade conference site of the MCU1 is also connected to the MCU1, the MCU2 is connected to two ordinary conference sites and one telepresence conference site. As shown in FIG. 6, two ordinary conference sites are T5 and T6, and one telepresence conference site is T4 including three screens which are T4L, T4C, and T4R. Each MCU supports reservation of audio data of three audio conference sites with the maximum voices, namely, the MCU selects audio data of three conference sites with the maximum voices from all connected conference sites (including the ordinary conference site, the telepresence conference site, and the cascade conference site) to perform encoding.

The MCU1 may receive audio code streams sent by T1L, T1C, T1R, and T2, and T3L, T3C, and T3R, and the MCU2 may receive audio code streams sent by T4L, T4C, T4R, T5 and T6, and a cascade conference site audio code stream and a cascade conference site video code stream that are sent by the MCU1. As shown in FIG. 6, in the embodiment of the present invention, cascade conference site video code streams sent by the MCU1 to the MCU2 are T2, T1C, and T3R, and in this embodiment, a process that the MCU1 sends cascade conference site media data to T1L, T1C, T1R, and T2, and T3L, T3C, and T3R is not described, and only a process that the MCU1 sends the cascade conference site audio code stream to the MCU2 is described.

The MCU1 decodes the audio code streams, respectively, to obtain conference site audio data corresponding to T1L, T1C, T1R, and T2, and T3L, T3C, and T3R, the conference site audio data corresponding to T1L, T1C, T1R, and T2, and T3L, T3C, and T3R is used as audio data to be selected, and according to the principle of reserving audio data of three parties with the maximum voices, audio data is screened out from the audio data to be selected. It is assumed that the audio data screened out according to the reserved audio data of three parties with the maximum voices is T1C, T2, and T3R, a video source of the received cascade conference site video code stream and an audio source of the screened audio data are completely the same, namely, conference attendees corresponding to the cascade conference site video code streams T2, T1C, and T3R and conference attendees corresponding to the screened audio data T1C, T2, and T3R are completely the same, the orientation sequence of the screened audio data may be correspondingly adjusted according to the sequence of the cascade conference site video code stream, and after the adjustment, the orientation sequence of the screened audio data and the orientation sequence of the cascade conference site video code stream are the same, so that the audio data whose sequence is adjusted is used as the cascade conference site audio data and is encoded to obtain audio code streams T1C, T2, and T3R of the MCU1, and the MCU2 can identify the audio code streams.

If the audio data screened out according to the reserved audio data of three parties with the maximum voices is not T1C, T2, or T3R, namely, the source of the screened audio data and the source of the cascade conference site video code stream are different, the conference site where the screened audio data is located is defined as an invisible conference site, and audio data corresponding to the invisible conference site may be adjusted according to the policy described in step 204 in FIG. 2.

It is described in the following from the perspective that the MCU2 is used as a receiving end. First, an audio code stream sent by the MCU1 is received, audio code streams sent by non-cascade conference sites T4, T5, and T6 connected to the MCU2 are received, and then, audio data satisfying a preconfigured condition is selected from the audio data to be selected; the process of selecting the audio data is the same as the processing process in the MCU1, which is not repeatedly described here again. Finally, the orientation sequence of the selected audio data may be adjusted, and the specific adjustment policy is illustrated in the embodiment in FIG. 2, which is not repeatedly described here again. In the embodiment of the present invention, the adjustment on a single audio data orientation does not influence other audio data, and one-to-one correspondence between an image orientation and a voice orientation of each conference site in the cascade conference can be implemented, thereby improving the user experience of a participant.

Figure 7:
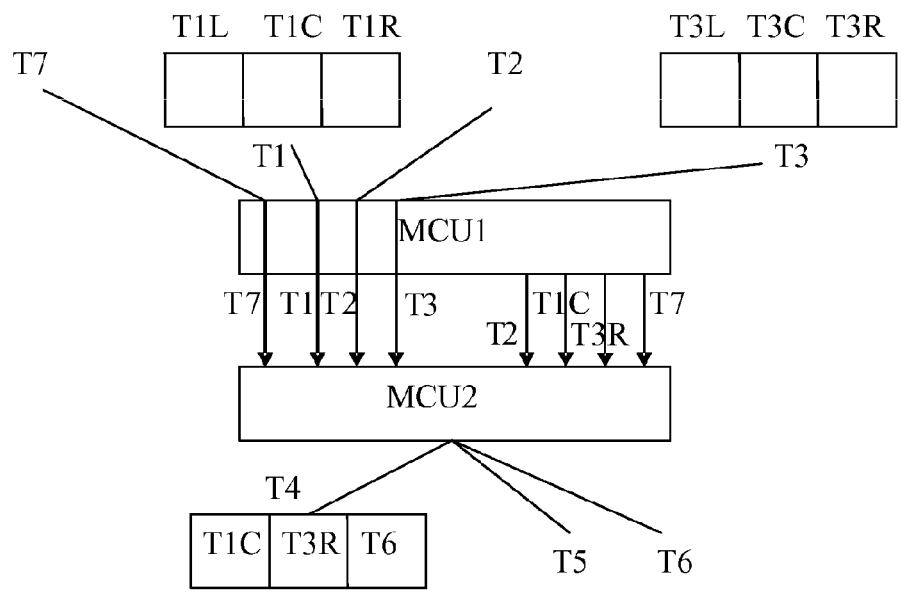
FIG. 7 is a structural diagram of cascade conference sites in another cascade conference according to an embodiment of the present invention.

An embodiment of the present invention is described in the following with another specific example. As shown in FIG. 7, a structure of cascade conference sites in a cascade conference according to another embodiment of the present invention is described, and in the embodiment of the present invention, more than two audio cascade channels are set, namely, an audio code stream is transmitted in each audio cascade channel, respectively, referring to what is shown in FIG. 7:

A cascade conference site has two MCUs which are an MCU1 and an MCU2, where the MCU1 is connected to the MCU2, and four audio cascade channels and four video cascade channels are connected between the MCU1 and the MCU2. The MCU1 is connected to two ordinary conference sites and two telepresence conference sites. As shown in FIG. 7, two ordinary conference sites are T2 and T7, and two telepresence conference sites are T1 and T3; meanwhile, the MCU2 used as a cascade conference site of the MCU1 is also connected to the MCU1, and the MCU2 is connected to two ordinary conference sites and a telepresence conference site. As shown in FIG. 7, two ordinary conference sites are T5 and T6. Cascade video sources between the MCU1 and the MCU2 are T2, T1C, T3R, and T7. Each MCU supports reservation of audio data of four audio conference sites with the maximum voices, namely, the MCU selects audio data of four conference sites with the maximum voices from all connected conference sites (including the ordinary conference site, the telepresence conference site, and the cascade conference site).

In the embodiment of the present invention, audio cascade channels of the MCU1 and the MCU2 are multiple in number, which may specifically be determined according to requirements of the cascade conference. Meanwhile, an audio cascade channel similarly screens the audio data according to the principle of reserving audio data of several parties with the maximum voices. In the embodiment of the present invention, audio cascade channels are four in number, and the sound channel quantity of each audio cascade channel may be a single sound channel, double sound channels, three sound channels or even more sound channels, which is not limited here. Because audio cascade channels are multiple in number, in the embodiment of the present invention, the audio data of the telepresence conference site may be used as audio data of a conference site, but the sound channel quantity of the audio cascade channels may be set to double sound channels or three sound channels, so as to ensure that an audio cascade channel can be loaded with all audio of a telepresence conference site.

The MCU1 may receive audio code streams sent by T1, T2, T3, and T7, and the MCU2 may receive audio code streams sent by T4, T5 and T6, and a cascade conference site audio code stream and a cascade conference site video code stream that are sent by the MCU1. As shown in FIG. 7, in the embodiment of the present invention, cascade conference site video code streams sent by the MCU1 to the MCU2 are T2, T1C, T3R, and T7, and in this embodiment, a process that the MCU1 sends cascade conference site media data to T1, T2, T3 and T7 is not described, and only a process that the MCU1 sends the cascade conference site audio code stream to the MCU2 is described.

The MCU1 decodes the audio code streams, respectively, to obtain conference site audio data corresponding to T1, T2, T3 and T7, the conference site audio data corresponding to T1, T2, T3 and T7 is used as audio data to be selected, and according to the principle of reserving audio data of four conference sites with the maximum voices, audio data T1, T2, T3 and T7 are screened out from the audio data to be selected, and are used as the cascade conference site audio data. And then, the four paths of audio data are loaded into corresponding audio cascade channels, respectively, and if the screened audio data is audio data of a telepresence conference site, the screened audio data is correspondingly loaded into an audio cascade channel of multiple sound channels.

After cascade conference site audio data is obtained, the cascade conference site audio data is encoded to obtain a cascade conference site audio code stream; and then, the cascade conference site audio code stream is sent to the cascade conference site MCU2, and a cascade conference site video code stream is sent to the cascade conference site MCU2.

A party with the maximum audio of the cascade channel constantly changes, and therefore, it is required to send audio cascade channel composition information in a code stream through the cascade audio channel, where the code stream is sent to the MCU2, and the audio cascade channel composition information is quantity information of audio cascade channels established by the cascade conference site, so as to obtain the quantity of audio cascade channels occupied by the received audio code stream. Specifically, the audio cascade channel composition information may be sent in an RTP information filling manner, but the present invention is not merely limited to the manner, which is not limited here.

After the MCU2 receives data of a conference site with the maximum audio of the cascade audio channel, in addition to conference site audio data directly connected to the MCU2, the MCU2 is actually equivalent to receiving independent data of each conference site T7, T1, T2, T3, T4, T5, and T6, and the orientation of the audio code stream of the corresponding conference site is adjusted and processed according to the case of the video code stream that needs to be displayed in the conference site on this MCU, so that the orientation sequence of each conference site video code stream corresponds to the orientation sequence of the corresponding audio code stream one to one.

It should be noted that, if the conference site of the audio cascade channel and a video conference site of a video cascade channel are not completely the same, the processing is performed according to the processing manner in the embodiment of the present invention as shown in FIG. 2, which is not repeatedly described here again.

In the foregoing content, the method for processing cascade conference sites in the cascade conference in the embodiment of the present invention is described, the apparatus for processing cascade conference sites in the cascade conference is described in the following, and the apparatus for processing cascade conference sites in the cascade conference provided in the embodiment of the present invention may be used as an MCU.

Figure 8:
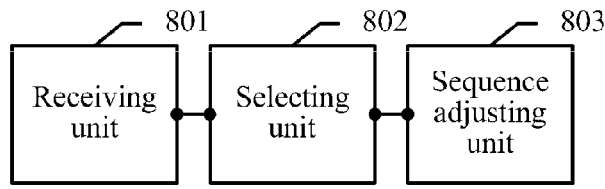
FIG. 8 is a schematic diagram of an apparatus for processing cascade conference sites in a cascade conference according to an embodiment of the present invention.

Referring to FIG. 8, an example of an apparatus for processing cascade conference sites in a cascade conference according to an embodiment of the present invention includes:

a receiving unit 801, configured to receive an audio code stream sent by a cascade conference site, where the audio code stream sent by the cascade conference site is sent to different conference sites through different audio sound channels or audio cascade channels, and further configured to receive an audio code stream sent by a non-cascade conference site;

a selecting unit 802, configured to select audio data satisfying a preconfigured condition from audio data to be selected, where the audio data to be selected includes: the audio code stream sent by the cascade conference site and the audio code stream sent by the non-cascade conference site; and a sequence adjusting unit 803, configured to adjust an orientation sequence of the audio data selected by the selecting unit 802.

In the embodiment of the present invention, because the audio code stream sent by the cascade conference site and received by the apparatus for processing cascade conference sites in the cascade conference is sent to different conference sites through different audio sound channels or audio cascade channels, when the apparatus for processing cascade conference sites in the cascade conference needs to perform orientation sequence adjustment on the audio data, the audio data orientation that needs to be adjusted can directly be adjusted individually, namely, the adjustment performed by the apparatus for processing cascade conference sites in the cascade conference on a single audio data orientation does not influence other audio data, and one-to-one correspondence between an image orientation and a voice orientation of each conference site in the cascade conference can be implemented, thereby improving the user experience of a participant.

It should be noted that, in the embodiment shown in FIG. 8 of the present invention, when the audio code stream sent by the cascade conference site is sent to different conference sites through different audio cascade channels, the receiving unit 801 is further configured to receive audio cascade channel composition information sent by the cascade conference site, where the audio cascade channel composition information is quantity information of audio cascade channels established by the cascade conference site, so as to obtain the quantity of audio cascade channels occupied by the received audio code stream.

The apparatus for processing cascade conference sites in the cascade conference may further include: a decoding unit, configured to decode the audio code stream sent by the cascade conference site and the audio code stream sent by the non-cascade conference site.

In the foregoing embodiment, it is described that the apparatus for processing cascade conference sites in the cascade conference receives the audio code stream of the cascade conference site, and adjusts the orientation sequence of the audio data satisfying a preconfigured condition. It is described in the following from the perspective that the apparatus for processing cascade conference sites in a cascade conference sends an audio code stream to a cascade conference site, and reference may be made to FIG. 9.

A receiving unit 901 is configured to receive an audio code stream sent by a non-cascade conference site and further configured to receive an audio code stream sent by a second cascade conference site.

A decoding unit 902 is configured to decode the audio code stream received by the receiving unit 901.

A selecting unit 903 is configured to select audio data satisfying a preconfigured condition from audio data to be selected, where the audio data to be selected specifically includes a result of the decoding of the decoding unit 902.

A processing unit 904 is configured to process the audio data selected by the selecting unit 903 to different conference sites through different audio sound channels or audio cascade channels to obtain cascade conference site audio data, so that a first cascade conference site can identify cascade conference site audio data.

An encoding unit 905 is configured to encode a result of the processing of the processing unit 904 to obtain an audio code stream.

A sending unit 906 is configured to send the audio code stream to the first cascade conference site.

It may be seen from the embodiment of the present invention that, the apparatus for processing cascade conference sites in the cascade conference of the embodiment of the present invention processes the audio data satisfying the preconfigured condition to different conference sites through different audio sound channels or audio cascade channels to obtain the cascade conference site audio data, so that when orientation sequence adjustment needs to be performed on the audio data, the first cascade conference site used as a receiving end can directly adjust the audio data individually.

Figure 10:
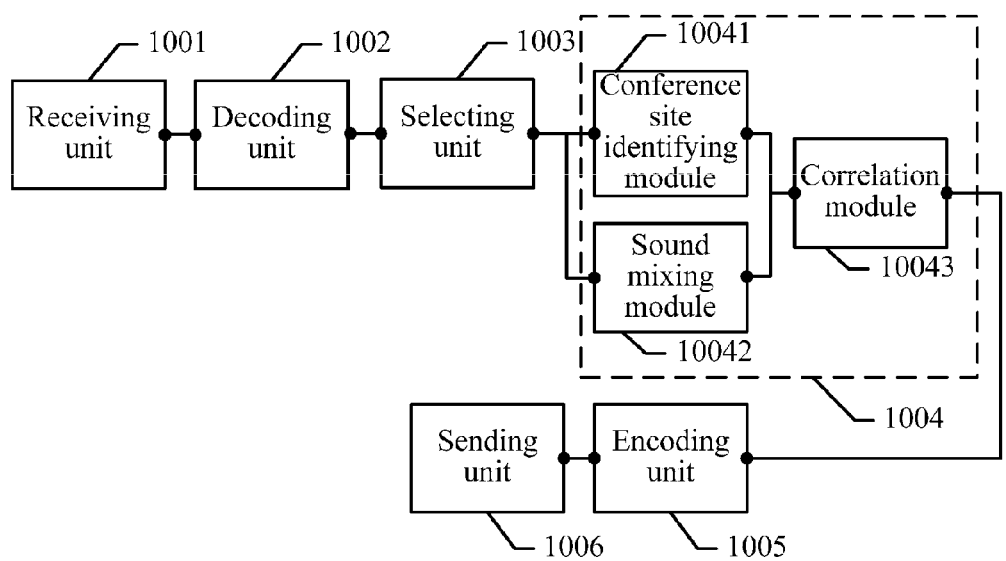
FIG. 10 is a schematic diagram of another apparatus for processing cascade conference sites in a cascade conference according to an embodiment of the present invention.

Further, referring to FIG. 10, in an embodiment of the present invention, only one audio cascade channel is set, and the audio cascade channel includes more than two audio sound channels, namely, an audio code stream is transmitted in each audio sound channel, respectively. Another example of an apparatus for processing cascade conference sites in a cascade conference according to an embodiment of the present invention includes:

a receiving unit 1001, configured to receive an audio code stream sent by a non-cascade conference site, and further configured to receive an audio code stream sent by a second cascade conference site;

a decoding unit 1002, configured to decode the audio code stream received by the receiving unit 1001;

a selecting unit 1003, configured to select audio data satisfying a preconfigured condition from audio data to be selected, where the audio data to be selected specifically includes a result of the decoding of the decoding unit 1002;

a processing unit 1004, which includes: a conference site identifying module 10041, configured to, if the audio data satisfying the preconfigured condition is audio data corresponding to a screen of a telepresence conference site, use the audio data corresponding to the screen of the telepresence conference site as audio data corresponding to a separate conference site; a sound mixing module 10042, configured to, if the audio data satisfying the preconfigured condition is audio data corresponding to an ordinary conference site and the sound channel quantity of the ordinary conference site is not a single sound channel, mix the audio data of the ordinary conference site into single sound channel audio data; and a correlation module 10043, configured to, according to an orientation sequence of a video code stream that needs to be sent, adjust an orientation sequence of the audio data satisfying the preconfigured condition according to different conference sites occupying different audio sound channels, respectively, and use the audio data which satisfies the preconfigured condition and whose orientation sequence is adjusted as cascade conference site audio data;

an encoding unit 1005, configured to encode the cascade conference site audio data obtained by the processing unit 1004 to obtain an audio code stream; and a sending unit 1006, configured to send the audio code stream to a first cascade conference site.

It should be noted that, in the embodiment of the present invention, when including the conference site identifying module 10041 and the sound mixing module 10042, the processing unit 1004 may also not include the correlation module 10043 but include the following modules: a sequencing module, configured to sequence the audio data satisfying the preconfigured condition according to different conference sites occupying different audio sound channels, and use the sequenced audio data satisfying the preconfigured condition as the cascade conference site audio data; and a generating module, configured to generate audio conference site location information, where the audio conference site location information is location sequencing information of the audio data satisfying the preconfigured condition. Meanwhile, the sending unit 1006 in the apparatus for processing cascade conference sites in the cascade conference in the embodiment of the present invention is further configured to send the audio conference site location information to the first cascade conference site.

In the embodiment of the present invention, more than two audio cascade channels may also be set, namely, an audio code stream is transmitted in each audio cascade channel, respectively, and in this case, the apparatus for processing cascade conference sites in the cascade conference includes the following unit: a generating unit, configured to generate audio cascade channel composition information, where the audio cascade channel composition information is quantity information of audio cascade channels established by the cascade conference site, so as to obtain the quantity of audio cascade channels occupied by the received audio code stream sent by the cascade conference site. Meanwhile, the sending unit 1006 in the apparatus for processing cascade conference sites in the cascade conference in the embodiment of the present invention is further configured to send the audio cascade channel composition information to the first cascade conference site.

It may be seen from the embodiment of the present invention that, the apparatus for processing cascade conference sites in the cascade conference processes the audio data satisfying the preconfigured condition to different conference sites through different audio sound channels or audio cascade channels to obtain the cascade conference site audio data, so that when orientation sequence adjustment needs to be performed on the audio data, the first cascade conference site used as a receiving end can directly adjust the audio data individually.

Figure 9:
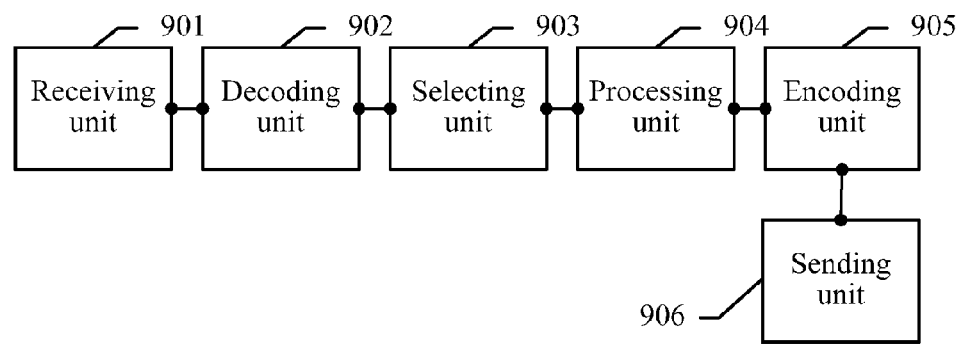
FIG. 9 is a schematic diagram of another apparatus for processing cascade conference sites in a cascade conference according to an embodiment of the present invention.

An embodiment of the present invention further provides a cascade conference system, which includes:

the apparatus for processing cascade conference sites in the cascade conference as shown in FIG. 8; and the apparatus for processing cascade conference sites in the cascade conference as shown in FIG. 9 or FIG. 10.

It may be seen from the embodiment of the present invention that, because the audio code stream received by the cascade conference system is sent to different conference sites through different audio sound channels or audio cascade channels, when the cascade conference system needs to perform orientation sequence adjustment on the audio data, the audio data that needs to be adjusted can directly be adjusted individually, namely, the adjustment performed by the cascade conference system on a single audio data orientation does not influence other audio data, and one-to-one correspondence between an image orientation and a voice orientation of each conference site in the cascade conference can be implemented, thereby improving the user experience of a participant.

Because the content such as information exchange and execution processes between all modules in the foregoing apparatus and system is based on a concept same as the method embodiments of the present invention, for the specific content, reference may be made to the descriptions in the method embodiments of the present invention, which is not repeatedly described here again.

Persons of ordinary skill in the art should understand that all or a part of the steps of the methods in the foregoing embodiments may be implemented by a program instructing relevant hardware. The program may be stored in a computer readable storage medium, and the foregoing-mentioned storage medium may be a read-only memory, a magnetic disk, or a compact disk, and so on.

The method, the apparatus, and the system for processing the cascade conference sites in the cascade conference provided in the present invention are introduced in detail in the foregoing. Persons of ordinary skill in the art can make variations in terms of specific implementation manners and application scopes according to the ideas of the embodiments of the present invention. To sum up, the content of the specification shall not be understood as limitations to the present invention.

What is claimed is:

1. A method for processing cascade conference sites in a cascade conference, comprising:
receiving an audio code stream sent by a cascade conference site, wherein the audio code stream sent by the cascade conference site is sent based on that different conference sites occupy different audio sound channels or audio cascade channels;
receiving an audio code stream sent by a non-cascade conference site;
selecting audio data satisfying a preconfigured condition from audio data to be selected, wherein the audio data to be selected comprises: the received audio code stream sent by the cascade conference site and the received audio code stream sent by the non-cascade conference site; and
adjusting an orientation sequence of the audio data satisfying the preconfigured condition.

2. The method for processing the cascade conference sites in the cascade conference according to claim 1, wherein the non-cascade conference site comprises: an ordinary conference site and/or a telepresence conference site.

3. The method for processing the cascade conference sites in the cascade conference according to claim 1, wherein when the audio code stream sent by the cascade conference site is sent based on that different conference sites occupy different audio cascade channels, the method further comprises: receiving audio cascade channel composition information sent by the cascade conference site, wherein the audio cascade channel composition information is quantity information of audio cascade channels established by the cascade conference site, so as to obtain the quantity of audio cascade channels occupied by the received audio code stream sent by the cascade conference site.

4. The method for processing the cascade conference sites in the cascade conference according to claim 1, wherein the preconfigured condition is to reserve audio data of several parties having maximum voices in the cascade conference site and the non-cascade conference site.

5. A method for processing cascade conference sites in a cascade conference, comprising:
receiving an audio code stream sent by a non-cascade conference site;
selecting audio data satisfying a preconfigured condition from audio data to be selected, wherein the audio data to be selected at least comprises the received audio code stream sent by the non-cascade conference site;
processing the audio data satisfying the preconfigured condition based on that different conference sites occupy different audio sound channels or audio cascade channels to obtain cascade conference site audio data, so that a first cascade conference site can identify the cascade conference site audio data;
encoding the cascade conference site audio data to obtain an audio code stream; and
sending the audio code stream to the first cascade conference site.

6. The method for processing the cascade conference sites in the cascade conference according to claim 5, wherein the non-cascade conference site comprises: an ordinary conference site and/or a telepresence conference site.

7. The method for processing the cascade conference sites in the cascade conference according to claim 5, wherein
the processing the audio data satisfying the preconfigured condition based on that different conference sites occupy different audio sound channels to obtain the cascade conference site audio data comprises:
if the audio data satisfying the preconfigured condition is audio data corresponding to a screen of a telepresence conference site, using the audio data corresponding to the screen of the telepresence conference site as audio data corresponding to a separate conference site;
if the audio data satisfying the preconfigured condition is audio data corresponding to an ordinary conference site and the sound channel quantity of the ordinary conference site is not a single sound channel, mixing the audio data of the ordinary conference site into single sound channel audio data; and
according to an orientation sequence of a video code stream that needs to be sent, adjusting an orientation sequence of the audio data satisfying the preconfigured condition according to different conference sites occupying different audio sound channels, respectively, and using the audio data which satisfies the preconfigured condition and whose orientation sequence is adjusted as the cascade conference site audio data.

8. The method for processing the cascade conference sites in the cascade conference according to claim 5, wherein
the processing the audio data satisfying the preconfigured condition based on that different conference sites occupy different audio sound channels to obtain the cascade conference site audio data comprises:

if the audio data satisfying the preconfigured condition is
audio data corresponding to a screen of a telepresence
conference site, using the audio data corresponding to
the screen of the telepresence conference site as audio
data corresponding to a separate conference site;

if the audio data satisfying the preconfigured condition is
audio data corresponding to an ordinary conference site
and the sound channel quantity of the ordinary conference site is not a single sound channel, mixing the audio
data of the ordinary conference site into single sound
channel audio data;

sequencing the audio data satisfying the preconfigured
condition according to different conference sites occupying different audio sound channels, respectively, and
using the sequenced audio data satisfying the preconfigured condition as the cascade conference site audio data;
and generating audio conference site location information,
wherein the audio conference site location information
is location sequencing information of the audio data
satisfying the preconfigured condition; and after the processing the audio data satisfying the preconfigured condition based on that different conference
sites occupy different audio sound channels or audio
cascade channels to obtain the cascade conference site
audio data, the method comprises: sending the audio
conference site location information to the first cascade
conference site.

9. The method for processing the cascade conference sites
in the cascade conference according to claim 5, wherein after the processing the audio data satisfying the preconfigured condition based on that different conference
sites occupy different audio cascade channels to obtain
the cascade conference site audio data, the method comprises:

generating audio cascade channel composition information, wherein the audio cascade channel composition
information is quantity information of audio cascade
channels established by the cascade conference site, so
as to obtain the quantity of audio cascade channels occupied by the received audio code stream sent by the cascade conference site; and after the processing the audio data satisfying the preconfigured condition based on that different conference
sites occupy different audio sound channels or audio
cascade channels to obtain cascade conference site
audio data, the method comprises: sending the audio
cascade channel composition information to the first
cascade conference site.

10. The method for processing the cascade conference sites
in the cascade conference according to claim 5, wherein the
preconfigured condition is to reserve audio data of several
parties with the maximum voices in a cascade conference site
and the non-cascade conference site.

11. An apparatus for processing cascade conference sites in
a cascade conference, comprising:

a receiving unit, configured to receive an audio code stream
sent by a cascade conference site, wherein the audio
code stream sent by the cascade conference site is sent
based on that different conference sites occupy different
audio sound channels or audio cascade channels, and
the receiving unit is further configured to receive an audio
code stream sent by a non-cascade conference site;

a selecting unit, configured to
select audio data satisfying a preconfigured condition from
audio data to be selected, wherein the audio data to be
selected comprises: the received audio code stream sent
by the cascade conference site and the received audio
code stream sent by the non-cascade conference site;
and a sequence adjusting unit, configured to adjust an orientation sequence of the audio data satisfying the preconfigured condition.

12. The apparatus for processing the cascade conference
sites in the cascade conference according to claim 11,
wherein when the audio code stream sent by the cascade
conference site is sent based on that different conference sites
occupy different audio cascade channels, the receiving unit is further configured to receive audio
cascade channel composition information sent by the
cascade conference site, wherein the audio cascade
channel composition information is quantity information of audio cascade channels established by the cascade conference site, so as to obtain the quantity of audio
cascade channels occupied by the received audio code
stream.

13. The apparatus for processing the cascade conference
sites in the cascade conference according to claim 11, further
comprising:

a decoding unit, configured to decode the audio code
stream sent by the cascade conference site and the audio
code stream sent by the non-cascade conference site.

14. An apparatus for processing cascade conference sites in
a cascade conference, comprising:

a receiving unit, configured to receive an audio code stream
sent by a non-cascade conference site;

a selecting unit, configured to
select audio data satisfying a preconfigured condition from
audio data to be selected, wherein the audio data to be
selected at least comprises the audio code stream sent by
the non-cascade conference site;

a processing unit, configured to process the audio data
satisfying the preconfigured condition based on that different conference sites occupy different audio sound
channels or audio cascade channels to obtain cascade
conference site audio data, so that a first cascade conference site can identify the cascade conference site audio
data;

an encoding unit, configured to encode the cascade conference site audio data to obtain an audio code stream; and a sending unit, configured to send the audio code stream to
the first cascade conference site.

15. The apparatus for processing the cascade conference
sites in the cascade conference according to claim 14,
wherein when processing the audio data satisfying the preconfigured condition based on that different conference sites
occupy different audio sound channels to obtain the
cascade conference site audio data, the processing unit
comprises:

a conference site identifying module, configured to, if the audio data satisfying the preconfigured condition
is audio data corresponding to a screen of a telepresence conference site, use the audio data corresponding to the screen of the telepresence conference site as
audio data corresponding to a separate conference
site;

a sound mixing module, configured to, if the audio data
satisfying the preconfigured condition is audio data
corresponding to an ordinary conference site and the
sound channel quantity of the ordinary conference
site is not a single sound channel, mix the audio data
of the ordinary conference site into single sound channel audio data; and a correlation module, configured to, according to an orientation sequence of a video code stream that needs to be sent, adjust an orientation sequence of the audio data satisfying the preconfigured condition based on that different conference sites occupy through different conference sites occupying different audio sound channels, respectively, and use the audio data which satisfies the preconfigured condition and whose orientation sequence is adjusted as the cascade conference site audio data.

16. The apparatus for processing the cascade conference sites in the cascade conference according to claim 14, wherein when processing the audio data satisfying the preconfigured condition based on that different conference sites occupy different audio sound channels to obtain the cascade conference site audio data, the processing unit comprises:

a conference site identifying module, configured to, if the audio data satisfying the preconfigured condition is audio data corresponding to a screen of a telepresence conference site, use the audio data corresponding to the screen of the telepresence conference site as audio data corresponding to a separate conference site;

a sound mixing module, configured to, if the audio data satisfying the preconfigured condition is audio data corresponding to an ordinary conference site and the sound channel quantity of the ordinary conference site is not a single sound channel, mix the audio data of the ordinary conference site into single sound channel audio data; and a sequencing module, configured to sequence the audio data satisfying the preconfigured condition according to different conference sites occupying different audio sound channels, and use the sequenced audio data satisfying the preconfigured condition as the cascade conference site audio data; and a generating module, configured to generate audio conference site location information, wherein the audio conference site location information is location sequencing information of the audio data satisfying the preconfigured condition; and the sending unit is further configured to send the audio conference site location information to the first cascade conference site.

17. The apparatus for processing the cascade conference sites in the cascade conference according to claim 14, wherein when processing the audio data satisfying the preconfigured condition based on that different conference sites occupy different audio cascade channels to obtain the cascade conference site audio data, the apparatus further comprises:

a generating unit, configured to generate audio cascade channel composition information, wherein the audio cascade channel composition information is quantity information of audio cascade channels established by the cascade conference site, so as to obtain the quantity of audio cascade channels occupied by the received audio code stream sent by the cascade conference site; and the sending unit is further configured to send the audio cascade channel composition information to the first cascade conference site.

* * * * *

UNITED STATES PATENT AND TRADEMARK OFFICE
CERTIFICATE OF CORRECTION

| | | |
|---|---|---|
| PATENT NO. | : 8,836,753 B2 | Page 1 of 1 |
| APPLICATION NO. | : 13/715436 | |
| DATED | : September 16, 2014 | |
| INVENTOR(S) | : Liang | |

It is certified that error appears in the above-identified patent and that said Letters Patent is hereby corrected as shown below:

Title Page, item [71] Applicant, "Guangdong (CN)" should read --Shenzhen (CN)--.

Signed and Sealed this
Second Day of June, 2015

Michelle K. Lee
*Director of the United States Patent and Trademark Office*